ANAEROBIC CURING COMPOSITION
William Arthur Lees, Chandlers Ford, and John Richard Swire, Southampton, England, assignors to Borden, Inc., a corporation of New Jersey
No Drawing. Filed Dec. 23, 1965, Ser. No. 516,111
5 Claims. (Cl. 260—29.7)

ABSTRACT OF THE DISCLOSURE

This invention relates to anaerobic adhesive compositions containing an acrylic monomer, an organic peroxide having a half-life greater than 5 hours at 100° C. (excluding hydroperoxide), an ionic substance which is capable of dissociating in water and has a dissociating constant greater than 10–6 and water. The composition is characterized by rapid cure in the absence of oxygen and enhanced unwinding torque values.

---

This invention relates to anaerobic curing compositions, and particularly to anaerobic curing adhesive compositions having an extended shelf life and capable of achieving their ultimate bond strength in a short time under anaerobic conditions.

It is known that certain unsaturated monomers such as the dimethacrylate or diacrylate esters of polyglycols can be stored for extended periods in the presence of oxygen but polymerize more rapidly in the absence of oxygen. Thus in copending application Ser. No. 397,023 filed Sept. 16, 1964 to which reference is here expressly made, there are described compositions having anaerobic curing properties while possessing an extended shelf-life in the presence of air or oxygen, which composition comprises, (a) a mixture of a monomer or partial polymer of a monomer corresponding to the general formula:

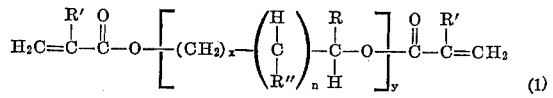

(1)

where R is —H, —CH$_3$, —C$_2$H$_5$, —CH$_2$OH or

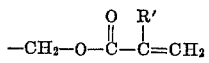

R' is —H, —Cl, —CH$_3$ or —C$_2$H$_5$; R" is —H, —OH or

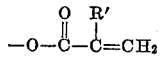

$x$ and $y$ are integers each equal to at least 1 and $n$ is 0 or 1, with, (b) an organic peroxide (as distinct from a hydroperoxide) having a half-life greater than 5 hours at 100° C. and, (c) optionally, an organic tertiary amine.

The composition described in said copending application has utility in the bonding of articles, especially metals, and is particularly suitable for use as a nut-locking composition.

In such uses, however, it is frequently necessary to provide a series of compositions capable of setting rapidly to a range of specified bond strengths or unwinding torque values. Particularly in cases where only a semi-permanent locking action is desired, it is essential that the unwinding torque necessary should not increase on ageing beyond a specified upper limit.

With the composition of the prior art we have found it a disadvantage that, although a measure of locking action is achieved within a short time, the unwinding torque required continues to increase on ageing, approaching its maximum only after an extended period. In addition, we had not previously found it possible to produce compositions which could be used to lock nuts at specified lower torque values. It was further not possible within a reasonable period, to achieve, with the unmodified compositions of said copending application, the very high unwinding torque values that are sometimes required.

We have now found that anaerobic curing compositions which cure rapidly in the absence of oxygen to give high unwinding torque values can be produced by employing in conjunction with the compositions of said copending application, an acid, or salt of an acid, and water, and that desired intermediate unwinding torque values can be obtained by the addition to the composition so produced, of a plasticizer having a degree of compatibility with water but containing no free hydroxyl groups.

Accordingly, the present invention comprises a composition having anaerobic curing properties while possessing an extended shelf life in the presence of air or oxygen, which comprises a mixture of acrylic material, which can be an acrylic monomer corresponding to the general formula (1) hereinbefore set forth or a partial polymer thereof, with an organic peroxide (as distinct from hydroperoxide) having a half-life (as hereinafter defined) greater than 5 hours at 100° C., optionally an organic tertiary amine, an ionic substance (as hereinafter defined), water in an amount between .25% and .5% of the total weight of the composition, and optionally, a plasticizer compatible with the acrylic material, said plasticizer being substantially free of free hydroxyl groups and being compatible with at least that amount of water used in the composition.

The preferred acrylic material is the dimethylacrylic acid ester of tetraethylene glycol. The preferred acid is methacrylic acid. However, satisfactory monomers for the purposes of the invention may be prepared using acrylic acid, ethyl acrylic acid, chloroacrylic acid or mixtures thereof and the monomer may contain 2 or more of the acid residues. Thus, suitable monomers include diethylene glycol diacrylate, diethylene glycol dimethacrylate, triethylene glycol dimethacrylate, tetraethylene glycol dimethacrylate, tetraethylene glycol diacrylate, dipropylene glycol dimethacrylate, diglycerol dimethacrylate, diglycerol tetramethacrylate and di(pentamethylene) glycol diacrylate.

As the peroxide component we prefer to employ 2,5-dimethyl-2,5-di(tertiary-butyl-peroxy)hexane. This compound has a half-life, as hereinabove defined, of approximately 65 hours at 100° C. By contrast, and by way of exemplifying a peroxide which is unsatisfactory for the practice of the current invention, benzoyl peroxide has a half-life of approximately 0.4 hours at 100° C. Other peroxides which may be used include ditertiary butyl peroxide, dihexylene glycol peroxide, tertiary-butyl-cumyl peroxide, and methyl-isobutyl-ketone peroxide.

The term "half-life" as used herein in relation to the peroxides is defined as the time required to reduce by 50% the active oxygen of a 5 mol percent solution of the peroxide in benzene at the specified temperature.

It has also been found that the incorporation of a tertiary amine in the compositions of the invention results in a further improvement in the shelf-life of the compositions. The preferred tertiary amine is dimethyl-p-toluidine, but other tertiary amines, such as dimethylaniline, tri-n-butylamine, triethylamine, 2-diethylaminoethanol and the like, may be employed.

The term "ionic substance" is used herein to denote an acid or salt which is capable of dissociating in water and which has a dissociation constant greater than 10$^{-6}$. Particularly suitable for the purposes of the present invention are polymerizable organic acids such as acrylic and methacrylic acid. Other organic acids, such as formic acid, acetic acid, maleic acid, phthalic acid and the like or inorganic acids, such as hydrochloric acid, may, however, be used in place of or in admixture with polymerizable organic acids.

Suitable salts, which may be employed in place of, or in addition to the acid, include sodium chloride, calcium chloride, sodium sulphate, ammonium citrate, potassium tartrate, ammonium acetate and the like.

Conveniently the acid or salt may be added as a solution in the water which also forms an ingredient of the composition.

As to proportions it is preferred to employ between 8 and 12 parts of the peroxide to every 100 parts of the acrylic material. Compositions which are satisfactory for many purposes may, however, be prepared using from 1 to 20 parts of the peroxide. Where less than 1 part is employed, the compositions are generally too inactive and do not polymerize sufficiently readily when air is excluded. With proportions of peroxide in excess of 20 parts to 100 of the acrylic material, the dilution effect is such that adequate bond strengths may not be achieved. Many peroxides are unstable and even explosive in the dry state and it is to be understood that, for the purposes of the invention, solutions or dispersions of the peroxides may be employed.

The preferred range of proportions for the tertiary amine is 0–15 parts for every 100 parts of the unoxygenated monomer. In some cases, however, satisfactory compositions may be achieved using up to 20 parts of the tertiary amine.

(glycol mono-methyl ether) phthalate, bis(glycol monoethyl ether) phthalate, bis(polyethylene - glycol monomethyl ether) phthalate, tris(glycol mono-methyl ether) trimellitic acid ester and the bis(glycol mono-methyl or ethyl ether) esters of malonic maleic or fumaric acids.

The following examples illustrate the manner in which the invention may be carried into effect, all parts being by weight:

EXAMPLE 1

A base composition was prepared by mixing 85 parts of the dimethacrylate ester of tetramethylene glycol, containing 85 parts per million of hydroquinone, with 10 parts of Triganox X.8 (2,5 - dimethyl-2,5 - di(tert. butyl peroxy) hexane (80% solution in dimethyl phthalate) and 5 parts of dimethyl-p-toluidine. To portions of this composition were then added the various ionic substances listed in the table below. The resultant compositions were then used to coat the threads of bright mild steel 5/16" BSF bolts on to which nuts were threaded. No torque was applied to the nuts until after the compositions had been allowed to age for 24 hours at 25° C. After this time, the various compositions were tested by applying an unwinding torque to the nuts and measuring the torque applied at intervals during unwinding. In the following table, which shows the results obtained, the first two rows are included merely for comparison.

| Additive | Mean unwinding torque observed (inch pounds) | | | | |
|---|---|---|---|---|---|
| | Initial (breakout torque) | At 1/8 turn | At 1/4 turn | At 1/2 turn | At 1 turn |
| None | 0 | 18 | 32.7 | 24 | 14 |
| 1% deionized water | 0 | 12 | 15 | 13 | 7 |
| 0.5% of a 10% aqueous sodium chloride soln | 35.9 | 88.6 | 109.9 | 87.4 | 51.4 |
| 0.5% of a 10% aqueous sodium sulphate soln | 17 | 65.5 | 86.0 | 66.2 | 47.0 |
| 0.5% of a 20% aqueous hydrated calcium chloride soln | 37.8 | 88.8 | 99.3 | 80.5 | 52.8 |
| 1% glacial methacrylic acid | 9.64 | 42.5 | 60.5 | 42.8 | 32.7 |
| 1% glacial acetic acid | 32.5 | 017.5 | 119 | 95.3 | 53.7 |
| 1% of 90% aqueous formic acid | 41.5 | 130.5 | 148.5 | 107.8 | 68.4 |

It is preferable to employ the ionic substance in an amount between about .005% and about 2% of the total weight of the composition. In general, salts are effective in smaller amounts than the organic acids. Thus the incorporation of .05% of sodium chloride has a similar effect, in terms of increase in unwinding torque, to the inclusion of 1% of glacial acetic acid. Although not having maximum effectiveness, however, ionic substances added in amounts below .005% are still capable of effecting some improvement over compositions containing no added ionic material. Amounts in excess of about 2% although effective in increasing the unwinding torque value, may have an undesirable effect on the storage life of the composition.

The compositions prepared in accordance with this invention and comprising added water and an ionic substance are capable of developing their maximum bond strength much more rapidly than the compositions of the prior art and of achieving, in addition, a higher maximum. While it is almost always desirable to achieve rapid development of strength, it is frequently necessary to limit bond strength, for example, so that a nut and bolt may be unscrewed without shearing. By adding to the compositions containing an ionic substance and water, varying amounts of a plasticizer, it is possible to obtain a range of compositions giving bond strengths which are approximately proportional to the amount of plasticizer added.

The plasticizer employed must be compatible, at least in the ratios employed, with the acrylic material and with at least that amount of water which is employed in the system. The preferred plasticizers are esters of monoalkyl ethers of alkylene and polyalkylene glycols in which the alkyl groups contain from 1 to 5 carbon atoms, the alkylene group or groups in the glycol residue each contain from 2 to 4 carbon atoms and the acids contain from 1 to 4 carboxyl groups. Suitable materials include bis

EXAMPLE 2

To illustrate the manner in which the bond strength may be varied as desired in accordance with the invention, a composition was prepared comprising:

| | Parts |
|---|---|
| Tetraethylene glycol dimethacrylate | 81 |
| Dimethyl-p-toluidine | 10 |
| 2,5-bis(tert. butyl peroxy)-2,5-dimethyl hexane | 7 |
| Methacrylic acid | 1 |
| Water | 1 |

To separate portions of this composition were then added varied amounts of bis(glycol mono-methyl ether) phthalate and the resultant mixes applied to 5/16" BSF bright mild steel bolts. A nut was then screwed on to the shank of each bolt and the assembly allowed to cure for 48 hours at room temperature. At the end of this period, the force required to rotate each nut on the bolt shanks was measured using a torque spanner. The results, each figure being an average of 5 individual values, are shown in the following table:

| Phthalate content (parts per 100) | Mean unwinding torque (inch lbs.) |
|---|---|
| 0 | 110 |
| 5 | 97 |
| 10 | 84 |
| 15 | 70 |
| 20 | 58 |
| 25 | 46 |
| 30 | 33 |

It will be understood that it is intended to cover all changes and modifications of the examples of the invention herein chosen for the purpose of illustration which do not constitute departures from the spirit and scope of the invention.

We claim:
1. An adhesive composition comprising an admixture of:
(1) acrylic material selected from the group consisting of:
(a) an acrylic monomer of the general formula:

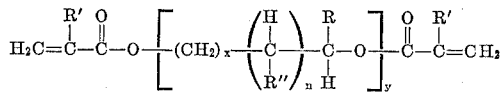

(i) R is selected from the group consisting of:

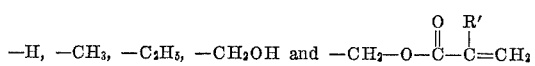

(ii) R' is selected from the group consisting of:
$$-H, -Cl, -CH_3 \text{ and } -C_2H_5$$
(iii) R" is selected from the group consisting of:

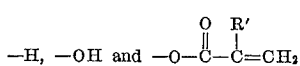

(iv) $x$ and $y$ are integers each equal to at least 1; and,
(v) $n$ is the integer 0 or 1; and,
(b) a partial polymer thereof;
(2) organic peroxide having a half-life greater than 5 hours at 100° C.;
(3) ionic substance selected from the group consisting of salts of
(a) alkali metals; and
(b) calcium;
said ionic substance capable of dissociating in water and having a dissociation constant greater than $10^{-6}$;
and being present in an amount between .005% and 2% of the total weight of the composition
(4) water in an amount between .25% and .5% of the total weight of said composition.

2. A composition according to claim 1 wherein a tertiary organic amine is incorporated therein.

3. A composition according to claim 1 wherein a plasticizer is incorporated therein, said plasticizer being substantially free of hydroxyl groups and being compatible with said acrylic material and with at least the amount of water present in said composition.

4. A composition according to claim 3 wherein the plasticizer is an ester of a mono-alkyl ether of a glycol selected from the group consisting of $C_2$-$C_4$:
(1) alkylene glycols; and,
(2) polyalkylene glycols;
in which said alkyl group contains from 1 to 5 carbon atoms, and the esterifying acid of said ester contains from 1 to 4 carboxyl groups.

5. A composition according to claim 4 wherein said ester is added in proportion of up to 30% by weight of said composition.

References Cited

UNITED STATES PATENTS

| | | | |
|---|---|---|---|
| 3,125,480 | 3/1964 | Kano et al. | 260—89.5 |
| 3,300,547 | 1/1967 | Gorman et al. | 260—885 |
| 3,180,777 | 4/1965 | Karo | 260—89.5 |
| 3,203,941 | 8/1965 | Krieble | 260—89.5 |

M. TILLMAN, *Primary Examiner.*

W. J. BRIGGS, *Assistant Examiner.*

U.S. Cl. X.R.

260—89.5; 156—327, 332

UNITED STATES PATENT OFFICE
CERTIFICATE OF CORRECTION

Patent No. 3,419,512　　　　　　　　　　　　　　December 31, 1968

William Arthur Lees et al.

It is certified that error appears in the above identified patent and that said Letters Patent are hereby corrected as shown below:

Columns 3 and 4, in the table, third column, line 7 thereof, "017.5" should read -- 107.5 --. Column 5, line 9, after the formula, insert -- wherein: --.

Signed and sealed this 9th day of December 1969.

(SEAL)
Attest:

Edward M. Fletcher, Jr.
Attesting Officer

WILLIAM E. SCHUYLER, JR.
Commissioner of Patents